(12) United States Patent
Baughman et al.

(10) Patent No.: US 11,009,361 B2
(45) Date of Patent: May 18, 2021

(54) DYNAMIC ROUTE GUIDANCE BASED ON REAL-TIME DATA

(71) Applicant: International Business Machines Corporation, Armonk, NY (US)

(72) Inventors: Aaron K. Baughman, Silver Spring, MD (US); Christian Eggenberger-Wang, Wil SG (CH); Lars M. Jenzer, Zurich (CH); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/196,048

(22) Filed: Nov. 20, 2018

(65) Prior Publication Data

US 2019/0107409 A1 Apr. 11, 2019

Related U.S. Application Data

(63) Continuation of application No. 15/236,590, filed on Aug. 15, 2016, now Pat. No. 10,746,559.

(51) Int. Cl.
*G01C 21/34* (2006.01)
*B64C 39/02* (2006.01)
(Continued)

(52) U.S. Cl.
CPC ........ *G01C 21/3484* (2013.01); *B64C 39/024* (2013.01); *G01C 21/28* (2013.01);
(Continued)

(58) Field of Classification Search
CPC ............... G01C 21/3484; G01C 21/28; G01C 21/3415; G08G 5/0013; G08G 5/0026;
(Continued)

(56) References Cited

U.S. PATENT DOCUMENTS 6,321,158 B1   11/2001  DeLorme et al.
8,777,275 B2   7/2014   Ully
(Continued)

FOREIGN PATENT DOCUMENTS

JP   2011037426 A   2/2011
WO   2015028906 A1  3/2015

OTHER PUBLICATIONS

"BlueBotics Mobile Robots at Your Service", Expo.02—RoboX | BlueBotics, Expo.02—Swiss National Exhibition, May to Nov. 2002, Copyright © 2016 BlueBotics, 1 page, <http://www.bluebotics.com/mobile-robotics/expo02-robox/>.
(Continued)

*Primary Examiner* — Jaime Figueroa
(74) *Attorney, Agent, or Firm* — Edward J. Wixted, III

(57) ABSTRACT

In an embodiment of the present invention, background data of a first user in a group of one or more users is received. Environmental data associated with a first route is received from a first group of one or more sensors. Environmental data associated with a second route is received from a second group of one or more sensors. It is determined whether to modify the first route into the second route based on the background data and the environmental data associated with the first route and the environmental data associated with the second route, and the determination occurs while the group of one or more users is traversing the first route.

13 Claims, 3 Drawing Sheets

(51) Int. Cl.
     *G01C 21/28*     (2006.01)
     *G08G 5/00*      (2006.01)
     *B64D 47/08*     (2006.01)

(52) U.S. Cl.
     CPC ....... *G01C 21/3415* (2013.01); *G08G 5/0013* (2013.01); *G08G 5/0026* (2013.01); *G08G 5/0034* (2013.01); *G08G 5/0039* (2013.01); *G08G 5/0069* (2013.01); *G08G 5/0078* (2013.01); *G08G 5/0086* (2013.01); *G08G 5/0091* (2013.01); *B64C 2201/146* (2013.01); *B64D 47/08* (2013.01)

(58) Field of Classification Search
     CPC .. G08G 5/0034; G08G 5/0039; G08G 5/0069; G08G 5/0078; G08G 5/0086; G08G 5/0091; B64C 39/024; B64C 2201/146; B64D 47/08
     USPC ...................................................... 701/1, 415
     See application file for complete search history.

(56) References Cited

U.S. PATENT DOCUMENTS

| | | |
|---|---|---|
| 8,810,392 B1 | 8/2014 | Teller |
| 8,832,251 B2 | 9/2014 | George |
| 8,929,874 B2 | 1/2015 | Mahaffey |
| 9,081,889 B2 | 7/2015 | Ingrassia, Jr. et al. |
| 9,188,985 B1* | 11/2015 | Hobbs ................ G01C 21/3626 |
| 9,386,152 B2 | 7/2016 | Riahi et al. |
| 9,420,958 B2 | 8/2016 | Fung |
| 9,741,191 B1 | 8/2017 | Wong |
| 9,791,281 B2 | 10/2017 | Baughman |
| 9,973,887 B2 | 5/2018 | Harding et al. |
| 10,372,881 B2 | 8/2019 | Ingrassia, Jr. et al. |
| 2002/0173905 A1 | 11/2002 | Jin et al. |
| 2003/0035416 A1* | 2/2003 | Zirojevic ................ H04L 45/00 370/357 |
| 2004/0054428 A1 | 3/2004 | Sheha et al. |
| 2004/0266457 A1 | 12/2004 | Dupray |
| 2008/0189030 A1 | 8/2008 | Aoki |
| 2008/0267504 A1 | 10/2008 | Schloter |
| 2009/0013052 A1 | 1/2009 | Robarts |
| 2009/0048774 A1 | 2/2009 | Yoshioka |
| 2010/0114469 A1 | 5/2010 | Chao et al. |
| 2010/0292050 A1 | 11/2010 | DiBenedetto |
| 2010/0332132 A1 | 12/2010 | Okude |
| 2011/0130956 A1 | 6/2011 | Tracton et al. |
| 2012/0015779 A1 | 1/2012 | Powch et al. |
| 2012/0116684 A1 | 5/2012 | Ingrassia, Jr. et al. |
| 2012/0190386 A1 | 7/2012 | Anderson |
| 2013/0031047 A1 | 1/2013 | Boazi et al. |
| 2013/0131986 A1 | 5/2013 | Van Seggelen et al. |
| 2013/0317944 A1 | 11/2013 | Huang et al. |
| 2014/0022051 A1 | 1/2014 | Levien |
| 2014/0309849 A1* | 10/2014 | Ricci ...................... G06Q 10/00 701/33.4 |
| 2014/0316614 A1 | 10/2014 | Newman |
| 2015/0120080 A1 | 4/2015 | Densham |
| 2015/0134143 A1 | 5/2015 | Willenborg |
| 2015/0179062 A1 | 6/2015 | Ralston |
| 2015/0266577 A1 | 9/2015 | Jones |
| 2015/0276415 A1 | 10/2015 | Shrinath |
| 2015/0317438 A1 | 11/2015 | Ingrassia, Jr. et al. |
| 2015/0330805 A1 | 11/2015 | Cho et al. |
| 2015/0377637 A1 | 12/2015 | Tanizaki |
| 2016/0001781 A1 | 1/2016 | Fung |
| 2016/0078095 A1 | 3/2016 | Man et al. |
| 2016/0091337 A1 | 3/2016 | Weast |
| 2016/0107509 A1 | 4/2016 | Kirsch |
| 2016/0330601 A1 | 11/2016 | Srivastava |
| 2016/0340006 A1* | 11/2016 | Tang ...................... B64C 39/024 |
| 2016/0357188 A1 | 12/2016 | Ansari |
| 2017/0127226 A1 | 5/2017 | Allen |
| 2017/0146349 A1 | 5/2017 | Yang et al. |
| 2017/0211940 A1 | 7/2017 | Baughman |
| 2017/0215031 A1 | 7/2017 | Harding et al. |
| 2017/0242428 A1 | 8/2017 | Pal |
| 2017/0276497 A1 | 9/2017 | Andrew |
| 2018/0011908 A1 | 1/2018 | Aggarwal et al. |
| 2018/0033300 A1 | 2/2018 | Hansen |
| 2018/0045529 A1 | 2/2018 | Baughman et al. |

OTHER PUBLICATIONS

"BlueBotics: Mobile Robots at Your Service with ANT Navigation", Printed Jan. 25, 2016, 1 page, Copyright © 2016 BlueBotics, <http://www.bluebotics.ch/>.

"Skycall", Project by the MITSenseable City Lab, Sep. 14, 2013, 4 pages, <http://senseable.mit.edu/skycall/>.

"Wil", From Wikipedia, the free encyclopedia, last modified on Sep. 22, 2015, at 11:25, 4 pages, <https://en.wikipedia.org/wiki/Wil>.

"BlueBotics—RoboX—interactive tour-guilding robot". YouTube. Uploaded on Jan. 14, 2010, 3 pages, <https:// www.youtuube.com/watch?v=HLfkTnU0kxE&feature=youtu.be&t=197>.

Brggenwirth et al., "COSA2—A Cognitive System Architecture with Centralized Ontology and Specific Algorithms", IEEE International Conference on Systems, Man, and Cybernetics, Oct. 14-17, 2012, Coex, Seoul, Korea, pp. 307-314.

Davies et al., "Using and Determining Location in a Context-Sensitive Tour Guide", Location Aware Computing, Aug. 2001, © 2001 IEEE, pp. 35-41.

Duvergne Smith, Nancy, "Skycall: Drones to Lead MIT Campus Tours?", Slice of MIT from the MIT Alumni Association, Oct. 3, 2013, 4 pages, <https://slice.mit.edu/2013/10/03/skycall-drones-to-lead-mit-campus-tours/>.

Hagen et al., "Semantic Matching and Heuristic Search for a Dynamic Tour Guide", Researchgate, Conference Paper, Jan. 2005, 12 pages.

Kramer et al., "A City Guide Agent Creating and Adapting Individual Sightseeing Tours Based on Field Trial Results", International Journal of Computational Intelligence Research, vol. 2, No. 2 (2006), © Research India Publications, pp. 191-206.

Souffriau, Wouter, "Automated Tourist Decision Support", Katholieke Universiteit Leuven, Mar. 2010, © Katholieke Universiteit Leuven—Faculty of Engineering Arenbergkasteel, B-3001 Leuven (Belgium), 196 pages.

Uhrmann et al., "Concept, Design and Evaluation of Cognitive Task-based UAV Guidance", International Journal on Advances in Intelligent Systems, vol. 5 No. 1 & 2, year 2012, http://www.iariajournals.org/intelligent_systems/, © Copyright by authors, Published under agreement with IARIA—www.IARIA.org, pp. 145-158.

Uhrmann et al., "Task-based Guidance of Multiple UAV Using Cognitive Automation", Cognitive 2011: The Third International Conference on Advanced Cognitive Technologies and Applications, © IARIA, 2011, pp. 47-52.

Webredactie Communication, "Tu Delft's ambulance drone drastically increases chances of survival of cardiac arrest patients", Delft University of Technology, Oct. 27, 2014, 2 pages, <http://www.tudelft.nl/en/current/latest-news/article/detail/ambulance-drone-tu-delft-vergroot-overlevingskans-bij-hartstilstand-drastisch/>.

Zheng et al., "Designing Multiparty Interaction Support in Elva, an Embodied Tour Guide", AAMAS'05, Jul. 25-29, 2005, Utrecht, Netherlands, Copyright 2005 ACM, pp. 929-936.

List of IBM Patents or Patent Applications Treated as Related, Appendix P, Filed Herewith, 2 pages.

* cited by examiner

DYNAMIC ROUTE GUIDANCE BASED ON REAL-TIME DATA

BACKGROUND OF THE INVENTION

The present invention relates generally to autonomous vehicles, and more particularly to dynamic navigation of autonomous vehicles.

Recent advances have focused on making vehicles operationally-autonomous or at least semi-autonomous. Autonomous vehicles, such as unmanned aerial vehicles (UAVs), can be remote controlled (i.e., flown by a pilot at a ground control station), or can fly autonomously based on pre-programmed flight plans or complex dynamic automation systems. Autonomous vehicles are finding uses in various civil (e.g., commercial and recreational) applications, such as photography and surveillance.

SUMMARY

Embodiments of the present invention include a method, computer program product, and computer system for optimizing a route based on the cognitive, affective, and somatic states of one or more persons. In an embodiment of the present invention, background data of a first user in a group of one or more users is received. Environmental data associated with the first route is received from a first group of one or more sensors. Environmental data associated with a second route is received from a second group of one or more sensors. It is determined whether to modify the first route into the second route based on the background data and the environmental data associated with the first route and the environmental data associated with the second route, and the determination occurs while the group of one or more users is traversing the first route.

DETAILED DESCRIPTION

Embodiments of the present invention recognize that an autonomous machine can be a safer, cheaper, and more efficient alternative to a person doing the same job. For example, a machine can receive and process data from several different sources simultaneously while also carrying out other tasks. Embodiments of the present invention further recognize that current methods of providing navigation to an unmanned vehicle do not account for the cognitive or somatic information received from users of the unmanned vehicle during the navigation. Embodiments of the present invention provide for an autonomous guidance system that determines a route based on real-time cognitive and somatic information.

Figure 1:
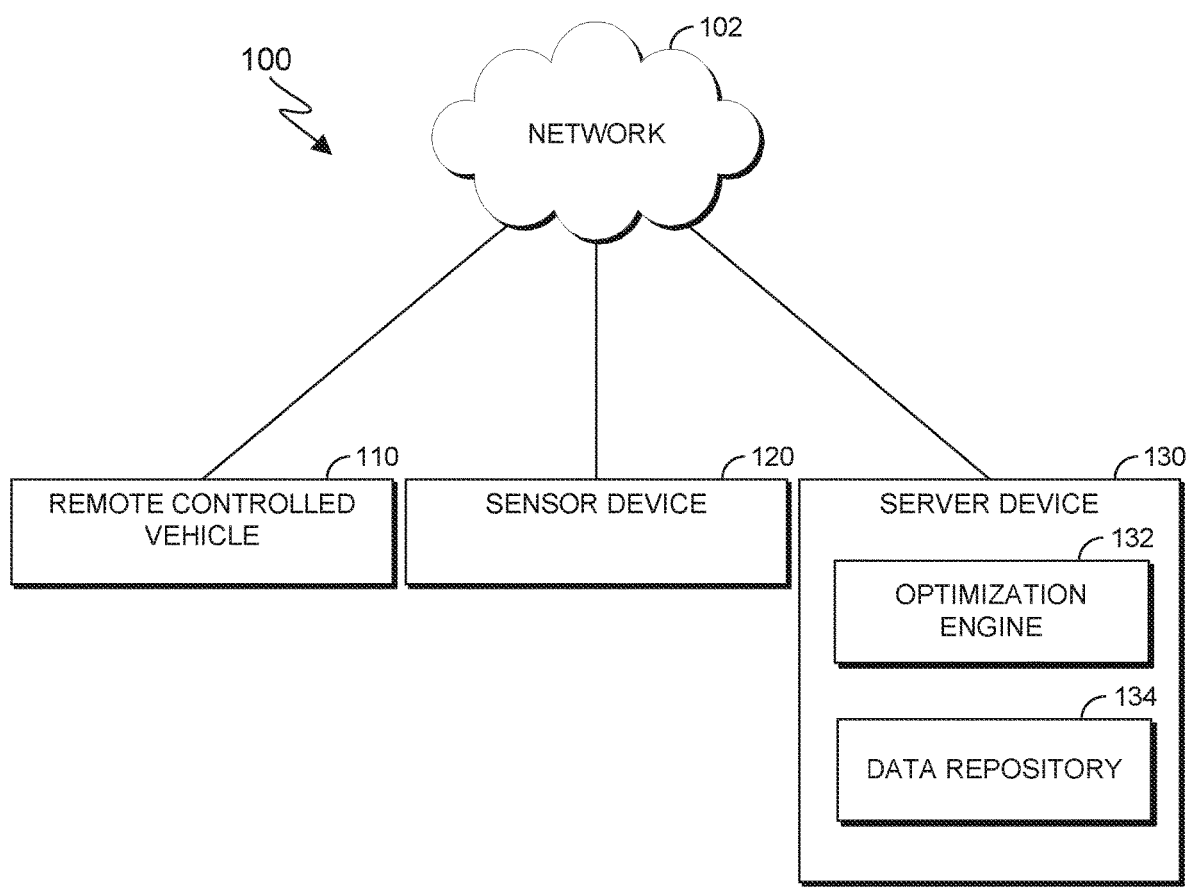
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In an embodiment, distributed data processing environment 100 includes remote controlled vehicle 110, sensor device 120, and server device 130. Remote controlled vehicle 110, sensor device 120, and server device 130 are interconnected through network 102. In an embodiment, distributed data processing environment 100 may additionally include any other computing device connected to network 102.

In an embodiment, network 102 may be a near field communication network (NFC), a broadcast communication network (e.g., GPS, terrestrial network), a local area network (LAN), a telecommunications network, a wide area network (WAN) such as the Internet, a low power WAN or a long range WAN (e.g., LoRaWAN), or a combination of thereof. Network 102 may include wired, wireless, or fiber optic connections. In an embodiment, network 102 may generally be any combination of connections and protocols that support communications between remote controlled vehicle 110, sensor device 120, server device 130, and any other computing device connected to network 102, in accordance with embodiments of the present invention.

In an embodiment, remote controlled vehicle 110 (RCV 110) may generally be any vehicle that is operable without a human pilot aboard the vehicle. As an example embodiment, RCV 110 may be an unmanned aerial vehicle (UAV). In an embodiment, RCV 110 may be controlled with varying degrees of autonomy. For example, RCV 110 may be fully autonomous such that RCV 110 is fully controlled by means (e.g., computing devices) onboard RCV 110. As another example, RCV 110 may be partially controlled by a remote (i.e., not onboard) human user and partially controlled by means onboard RCV 110. As another example, RCV 110 may be fully controlled by a remote human user. In an embodiment, RCV 110 may act as a tour guide by guiding tour participants along a route. For example, RCV 110 may guide a group of participants along a route through a national park. In an embodiment, RCV 110 is capable of executing computer readable program instructions. In an embodiment, remote controlled vehicle 110 may include components depicted and described with respect to FIG. 3.

In an embodiment, sensor device 120 may be one or more sensor devices that identify and collect environmental data as well as physiometric data of persons associated with the one or more sensors. In an embodiment, during route navigation by RCV 110 (e.g., during a tour guided by RCV 110), sensor device 120 continuously identifies and collects the environmental data and the physiometric data of participants traversing a route navigated by RCV 110. In an embodiment, environmental data includes weather conditions (e.g., temperature, humidity, wind speed, dangers or obstacles) and crowd data (e.g., identifying the number of non-participant people on the current route). Environmental data includes data relating to a route currently being navigated by RCV 110 as well as data relating to other areas, or potential new routes. In an embodiment, physiometric data may include measurable biological and neurological characteristics including blood pressure, heart rate, heart rate variability (HRV), body temperature, respiration levels, glucose levels, gestures, facial expressions, voice recognition, and brain activity (e.g., alpha waves).

In an embodiment, sensor device 120 may be a wearable device that is worn by a person, and sensor device 120 collects physiometric data associated with that person. For example, sensor device 120 may be worn by each participant of a tour guided by RCV 110, and during the tour, sensor device 120 continuously detects, and sends to optimization engine 132, the physiometric data associated with each tour participant. In an alternative embodiment, sensor device 120 may be located on RCV 110 instead of, or in addition to, being a wearable device worn by each participant. In an embodiment, sensor device 120 communicates the environmental data and the physiometric data to optimization engine 132 through network 102, and the data is stored in data repository 134.

In an embodiment, server device 130 may generally be any electronic device or combination of electronic devices capable of executing computer readable program instructions. In example embodiments, server device 130 may be a workstation, personal computer, personal digital assistant, or mobile phone. In an embodiment, server device 130 may be a computer system utilizing clustered computers and components (e.g., database server devices or application server devices) that act as a single pool of seamless resources when accessed by elements of distributed data processing environment 100, such as in a cloud computing environment. In an embodiment, server device 130 may be computer 300 and may include components depicted and described with respect to FIG. 3.

In an embodiment, server device 130 includes optimization engine 132. In an alternative embodiment, optimization engine 132 may be located on RCV 110. In yet another alternative embodiment, optimization engine 132 may be located on another computing device (not shown) connected to network 102. In an embodiment, optimization engine 132 may generally be a computer program, application, subprogram of a larger program, or combination thereof that optimizes a route to be traveled by RCV 110 based on cognitive, affective, and somatic states of associated persons, or participants. In an embodiment, a route is a specified course of travel between locations. As an example, RCV 110 may act as a tour guide by leading, or guiding, a tour group along a route, and the participants in the tour group are associated with RCV 110. Optimization engine 132, in that case, would optimize a tour route for RCV 110 based on the cognitive, affective, and somatic states of the tour participants, and RCV 110 would travel along the optimized route, guiding the participants.

In an embodiment, optimization engine 132 communicates with RCV 110, sensor device 120, and data repository 134 for optimizing a route to be traveled by RCV 110. In an embodiment, optimization engine 132 optimizes the route based on background data corresponding to each participant, or person associated with optimization engine 132, on environmental data, and on physiometric data of each participant.

In an embodiment, background data includes age, gender, preferred language, profession (e.g., physician), physical disabilities (e.g., requires a wheelchair), special fears (e.g., claustrophobic), special interests (e.g., history), special skills (e.g., certified in cardiopulmonary resuscitation (CPR)), previous tour experiences and evaluations, or tour objectives. In an embodiment, a tour objective includes one or more goals to be accomplished during the tour such as goals related to learning, physical fitness, time, or mental stress and relaxation. For example, a tour objective of a participant may be to achieve a high level of relaxation without regard to learning or physical fitness. As another example, a tour objective may be to achieve a combination of a high level of physical fitness and some level of learning, and to do so for no longer than two hours.

In an embodiment, optimization engine 132 receives the background data through a user interface of optimization engine 132. In an alternative embodiment, optimization engine 132 receives the background data from one or more computing devices connected to network 102. For example, each participant may indicate the background data to optimization engine 132 through a personal computer (not shown) connected to network 102.

A user interface is the information, such as graphic, text, and sound, a program presents to a user and the control sequences the user employs to control the program. There are many types of user interfaces. For example, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. GUIs were introduced for computers in response to the perceived steep learning curve of command-line interfaces, which required commands to be typed on the keyboard. The actions in GUIs may be performed by a user through direct manipulation of the graphical elements.

In an embodiment, server device 130 includes data repository 134. In an alternative embodiment, data repository 134 may be located on RCV 110. In yet another alternative embodiment, data repository 134 may be located on another computing device (not shown) connected to network 102. In an embodiment, data repository 134 may generally be a storage location for the physiometric data and the participant background information.

In an embodiment, data repository 134 contains the physiometric data collected by sensor device 120 during route navigation of RCV 110 and the participant background data collected prior to route navigation of RCV 110. In an embodiment, physiometric data stored in data repository 134 includes measurable physiological characteristics including blood pressure, heart rate, HRV, body temperature, respiration levels, glucose levels, gestures, facial expressions, voice recognition, or brain activity (e.g., alpha waves). In an embodiment, background information stored in data repository 134 includes age, gender, preferred language, profession (e.g., physician), physical disabilities (e.g., requires a wheelchair), special fears (e.g., claustrophobic), special interests (e.g., history), special skills (e.g., certified in CPR), previous tour experiences and evaluations, and tour objectives. In an embodiment, the physiometric data and the background data are associated are stored and associated with each participant of the tour. Optimization engine 132 may access data repository 134 to add to, remove, edit, or otherwise utilize the data physiometric data and the participant background information.

In an embodiment, data repository 134 may be implemented using any non-volatile storage media known in the art. For example, data repository 134 may be implemented with a tape library, optical library, one or more independent hard disk drives or flash drives, or multiple hard disk drives or flash drives in a redundant array of independent disks (RAID). Data repository 134 may be implemented using any suitable storage architecture known in the art. For example, data repository 134 may be implemented with a relational database or an object-oriented database.

Figure 2:
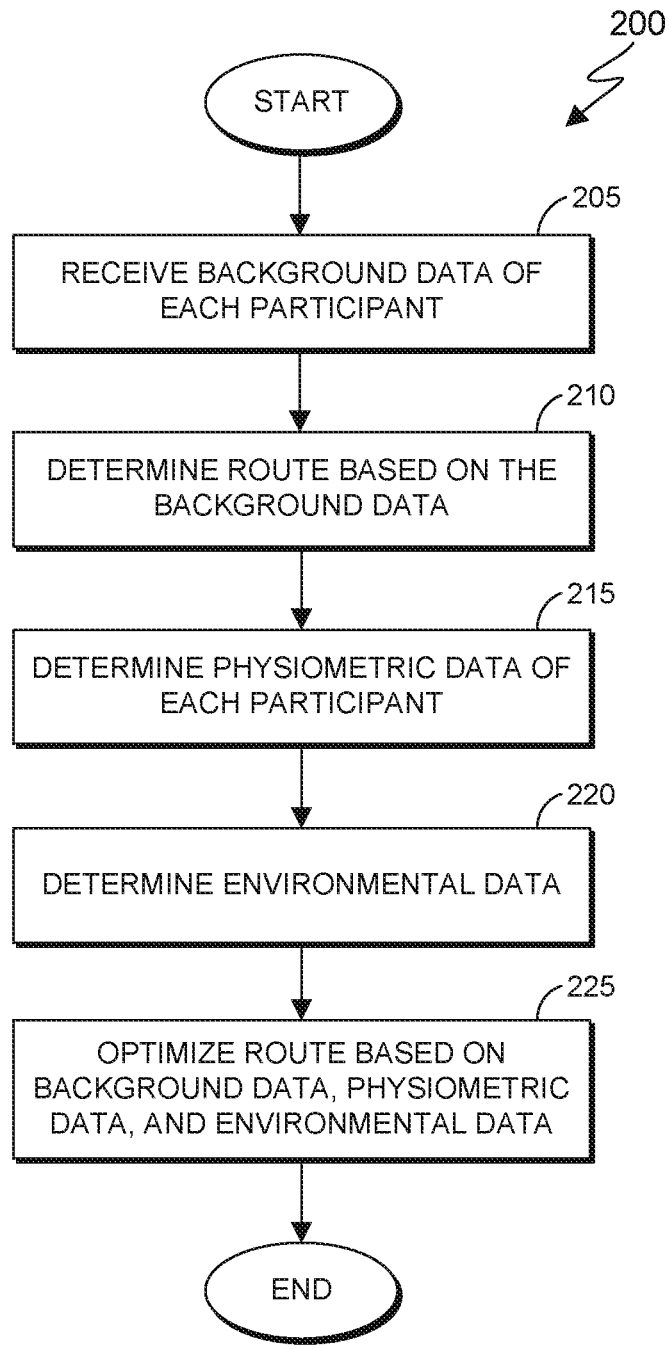
FIG. 2 is a flowchart of operational steps for optimizing a route based on the cognitive, affective, and somatic states of one or more persons, in accordance with an embodiment of the present invention.

FIG. 2 is a flowchart of workflow 200 illustrating operational steps for optimizing a route based on the cognitive, affective, and somatic states of one or more persons. In the illustrated embodiment, the steps of workflow 200 are performed by optimization engine 132. In an alternative embodiment, steps of workflow may be performed by any other computer program while working with optimization engine 132. In an embodiment, optimization engine 132 begins performing the steps of workflow 200 in response to receiving an indication by a user to optimize a route based on the cognitive, affective, and somatic states of one or more persons. In an embodiment, a user may provide such an indication through the user interface of optimization engine 132.

Optimization engine 132 receives background data of each participant (step 205). In other words, in an embodiment, optimization engine 132 receives background data of each participant of a tour to be guided by RCV 110. In an embodiment, background data of a participant may include age, gender, preferred and understood languages, profession (e.g., physician), physical disabilities (e.g., requires a wheelchair), special fears (e.g., claustrophobic), special interests (e.g., history), special skills (e.g., certified in CPR), previous tour experiences and evaluations, and tour objectives. In an embodiment, tour objectives of a participant may include goals to be accomplished during a tour such as goals related to learning, physical fitness, tour duration, or mental stress and relaxation. For example, a tour objective of a participant may be to achieve a high level of relaxation without regard to achieving learning or physical fitness goals. As another example, tour objectives of a participant may be a high level of physical fitness, a medium level of learning, and a tour duration of no longer than two hours.

In an embodiment, optimization engine 132 receives the background data from one or more computing devices connected to network 102. For example, prior to a tour guided by RCV 110, each participant of the tour may indicate the background data to optimization engine 132 through a personal computer or mobile device connected to network 102. In an alternative embodiment, optimization engine 132 receives the background data through the user interface of optimization engine 132. In an embodiment, the background data is stored in data repository 134.

Optimization engine 132 determines a route based on the background data (step 210). In other words, optimization engine 132 determines a route of a tour to be guided by RCV 110 based on the background data of each participant. For example, where a majority of the tour participants indicated a tour objective of a high level of physical fitness and a fear of heights, optimization engine 132 may determine a route for RCV 110 that includes several extreme changes in elevation (e.g., through a mountainous area) and is not near any cliff faces.

In an embodiment, a route for RCV 110 has been previously determined, and optimization engine 132 modifies the existing route such that the route accommodates the background data of each participant. For example, where optimization engine 132 determines that the background data of participants of a current tour is similar to the background data of participants of a previous tour at the same location, optimization engine 132 may determine the same route for RCV 110 to utilize for the current tour. Where a majority of participants of the current tour indicated a tour objective of a one-hour tour duration, and the previous tour had a duration of thirty minutes, optimization may modify the existing route to be twice the original distance.

Optimization engine 132 determines physiometric data of each participant (step 215). In other words, during a tour, optimization engine 132 continuously receives physiometric data of each participant from sensor device 120 while the participant is traversing the route guided by RCV 110. In an embodiment, physiometric data includes measurable biometric and neurological characteristics including blood pressure, heart rate, HRV, body temperature, respiration levels, glucose levels, gestures, facial expressions, voice recognition (e.g., determining the subject matter of questions asked by participants while traversing the route), and brain activity (e.g., alpha waves).

In an embodiment, sensor device 120 may be a wearable device that is worn by each participant of a tour guided by RCV 110, and sensor device 120 collects physiometric data associated with that person. In an alternative embodiment, sensor device 120 may be located on RCV 110 instead of, or in addition to, being a wearable device worn by each participant. For example, sensor device 120 may include a camera to detect facial expressions, and optimization engine 132 may associate various facial expressions or micro expressions with moods such as happiness, fear, or anger.

Optimization engine 132 determines environmental data (step 220). In other words, during a tour, optimization engine 132 continuously receives environmental data from sensor device 120. In an embodiment, environmental data includes weather conditions (e.g., temperature, humidity, wind speed, dangers or obstacles) and crowd data (e.g., identifying the number of non-participant people on the current route). In an embodiment, a danger or obstacle may include, for example, a forest fire, a rock slide, a tornado, a hunter, and a dangerous wild animal (e.g., bear). In an embodiment, optimization engine 132 additionally determines environmental data from websites or social media platforms. For example, optimization engine 132 may determine that there is a forest fire along or near the route based on a recent news article received from a website, or based on user submissions or user status updates on social media platforms.

Optimization engine 132 optimizes the route based on the background data, the physiometric data, and the environmental data (step 225). In other words, during the tour, optimization engine 132 modifies the route being navigated by RCV 110 based on the background data collected prior to the tour, the physiometric data continuously received during the tour, or the environmental data continuously received during the tour, or a combination of the foregoing data categories. In an embodiment, the route comprises one or more points of interest to which RCV 110 navigates, and optimization engine 132 modifies the route by adding or removing one or more points of interest from the route.

In an embodiment, optimization engine 132 continuously compares the background information, including the tour objectives, with the current physiometric data determined for each participant to determine whether the background information is satisfied by the route. In an embodiment, where optimization engine 132 determines that the current physiometric data does not satisfy the background information, optimization engine 132 modifies the route to be navigated by RCV 110 into a new route based on environmental data.

As an example, where a majority of participants indicated a tour objective of a high level of physical fitness, and no participants indicated physical disabilities, and the majority of participants have an average or below average heart rate and respiration levels, optimization engine 132 may optimize the route by increasing the speed of travel of RCV 110, decreasing the amount of stops to be taken by RCV 110 during the route, and navigating RCV 110 through more inclined terrain and less flat terrain. As another example, where a majority of participants indicated a tour objective of stress relief, and optimization engine 132 determines that a majority of participants have blood pressure levels that have increased since the start of the tour, optimization engine 132 may optimize the route by utilizing crowd data received from sensor 120 and navigating RCV 110 through the least crowded pathways and the shortest route to the end of the tour. As another example, where a majority of participants indicated a special interest of history and optimization engine 132 determines that, based on facial expressions or micro expressions of participants detected by sensor 120, a majority of participants are currently unhappy or bored, optimization engine 132 may optimize the route by navigating RCV 110 to a nearby historical national monument.

In an embodiment, optimization engine 132 continuously analyzes the environmental data to determine dangers or obstacles along the route. Where optimization engine 132 determines a danger or obstacle along the route, optimization engine 132 modifies the route to be navigated by RCV 110 into a new route based on the environmental data that avoids the danger or obstacle. For example, where optimization engine 132 determines, based on data received from sensor 120, websites, or social media platforms, that a forest fire is nearby to the west of the route, optimization engine 132 modifies the route into a new route that is farther to the east of the forest fire.

Figure 3:
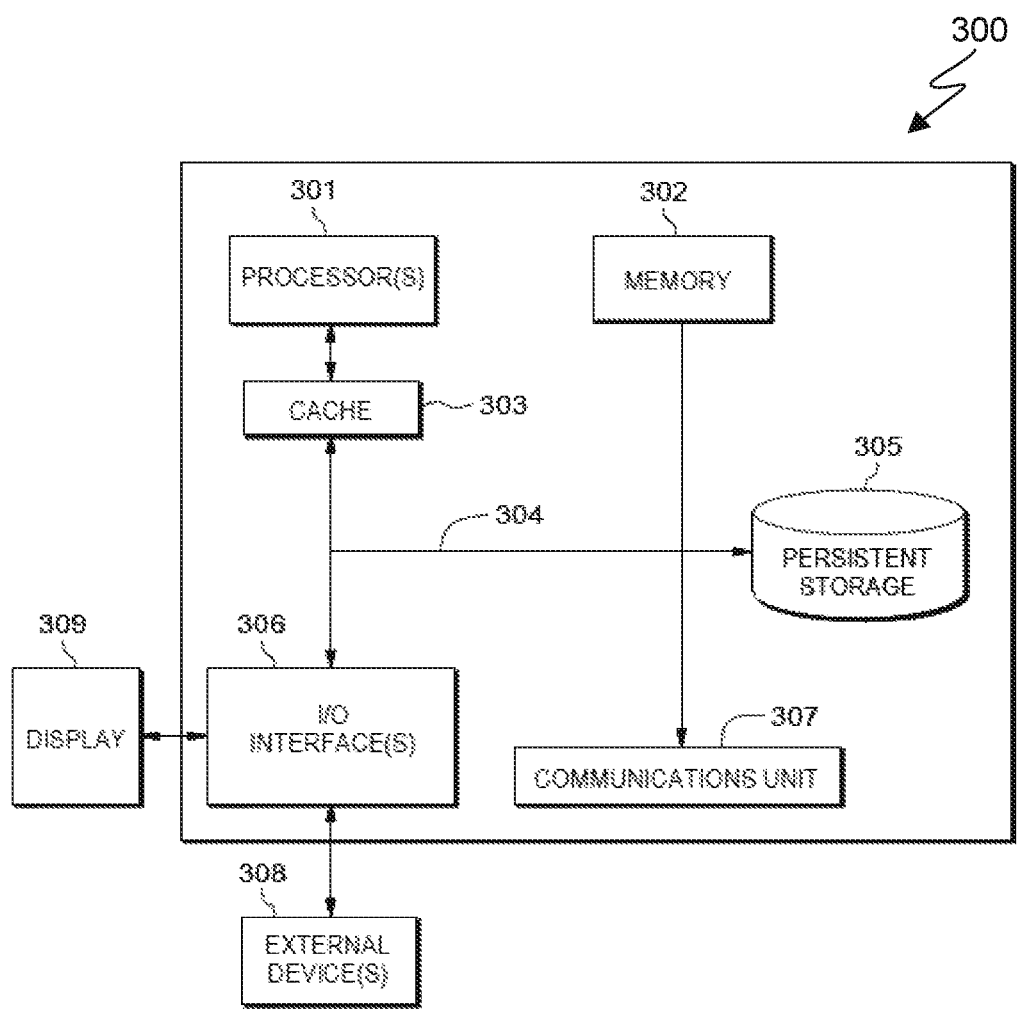
FIG. 3 is a functional block diagram of components of the server device of FIG. 1, in accordance with an embodiment of the present invention.

FIG. 3 depicts computing system 300, which illustrates components of server device 130, which may include optimization engine 132 (not shown in FIG. 3). Computing system 300 includes processor(s) 301, cache 303, memory 302, persistent storage 305, communications unit 307, I/O interface(s) 306, and communications fabric 304. Communications fabric 304 provides communications between cache 303, memory 302, persistent storage 305, communications unit 307, and I/O interface(s) 306. Communications fabric 304 can be implemented with any architecture designed for passing data and/or control information between processors (e.g., microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In an embodiment, memory 302 includes random access memory (RAM) (not shown). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
receiving, by one or more computer processors, from a first group of one or more sensors, physiometric data of a first user in a group of one or more users, while the group of one or more users is traversing a route, wherein the physiometric data includes biological characteristics of the first user;
receiving, by one or more computer processors, from a second group of one or more sensors, environmental data associated with the route; and
changing, by one or more computer processors, a number of stops along the route, while the group of one or more users is traversing the route, based on the physiometric data and the environmental data associated with the first route.

2. The method of claim 1, wherein the second group of one or more sensors includes one or more cameras mounted on an unmanned aerial vehicle.

3. The method of claim 1, further comprising:
receiving, by one or more computer processors, additional environmental data from websites and social media platforms.

4. The method of claim 1, wherein the environmental data is selected from the group consisting of environment temperature, humidity, wind speed, terrain elevation change, and crowd data.

5. A computer program product comprising:
one or more computer readable storage media, wherein the one or more computer readable storage media are not transitory signals per se; and
program instructions stored on the one or more computer readable storage media, the program instructions comprising:
program instructions to receive, from a first group of one or more sensors, physiometric data of a first user in a group of one or more users, while the group of one or more users is traversing a route, wherein the physiometric data includes biological characteristics of the first user;
program instructions to receive, from a second group of one or more sensors, environmental data associated with the route; and
program instructions to change a number of stops along the route, while the group of one or more users is traversing, the route, based on the background physiometric data and the environmental data associated with the first route.

6. The computer program product of claim 5, wherein the second group of one or more sensors includes one or more cameras mounted on an unmanned aerial vehicle.

7. The computer program product of claim 5, further comprising:
program instructions to receive additional environmental data from websites and social media platforms.

8. The computer program product of claim 5, wherein the environmental data is selected from the group consisting of environment temperature, humidity, wind speed, terrain elevation change, and crowd data.

9. A computer system comprising:
one or more computer processors;
one or more computer readable storage media, wherein the one or more computer readable storage media are not transitory signals per se; and
program instructions, stored on the one or more computer readable storage media, for execution by at least one of the one or more computer processors, the program instructions comprising:
program instructions to receive, from a first group of one or more sensors, physiometric data of a first user in a group of one or more users, while the group of one or more users is traversing a route, wherein the physiometric data includes biological characteristics of the first user;
program instructions to receive, from a second group of one or more sensors, environmental data associated with the route; and
program instructions to change a number of stops along the route, while the group of one or more users is traversing, the route, based on the physiometric data and the environmental data associated with the first route.

10. The computer program product of claim 5, wherein the second group of one or more sensors includes one or more cameras mounted on an unmanned aerial vehicle.

11. The computer system of claim 9, further comprising:
program instructions to receive additional environmental data from websites and social media platforms.

12. The computer system of claim 9, wherein the environmental data is selected from the group consisting of environment temperature, humidity, wind speed, terrain elevation change, and crowd data.

13. The method of claim 1, wherein the physiometric data is selected from the group consisting of heart rate variability and brain activity.

* * * * *